Feb. 16, 1926.
F. DROZD
COTTON CHOPPER
Filed May 16, 1925 2 Sheets-Sheet 1
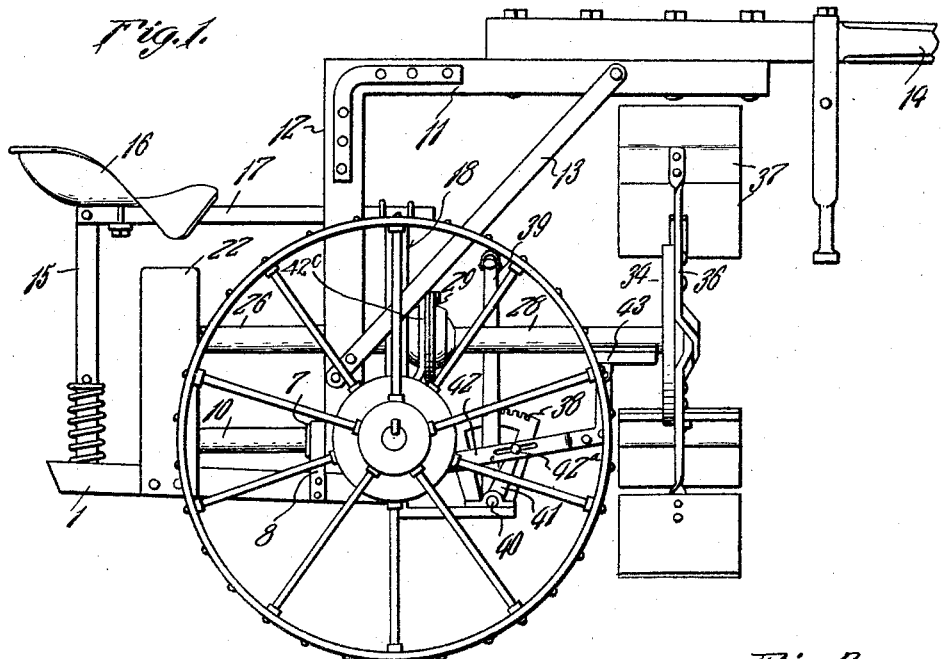
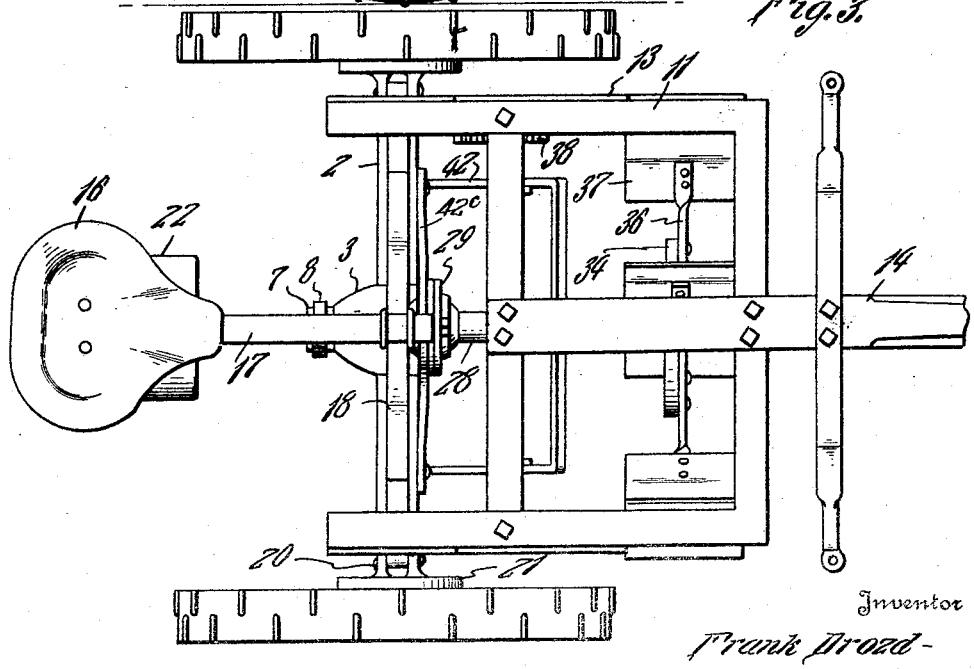
Inventor
Frank Drozd
By [signature] Attorney Feb. 16, 1926. 1,573,637
F. DROZD
COTTON CHOPPER
Filed May 16, 1925 2 Sheets-Sheet 2
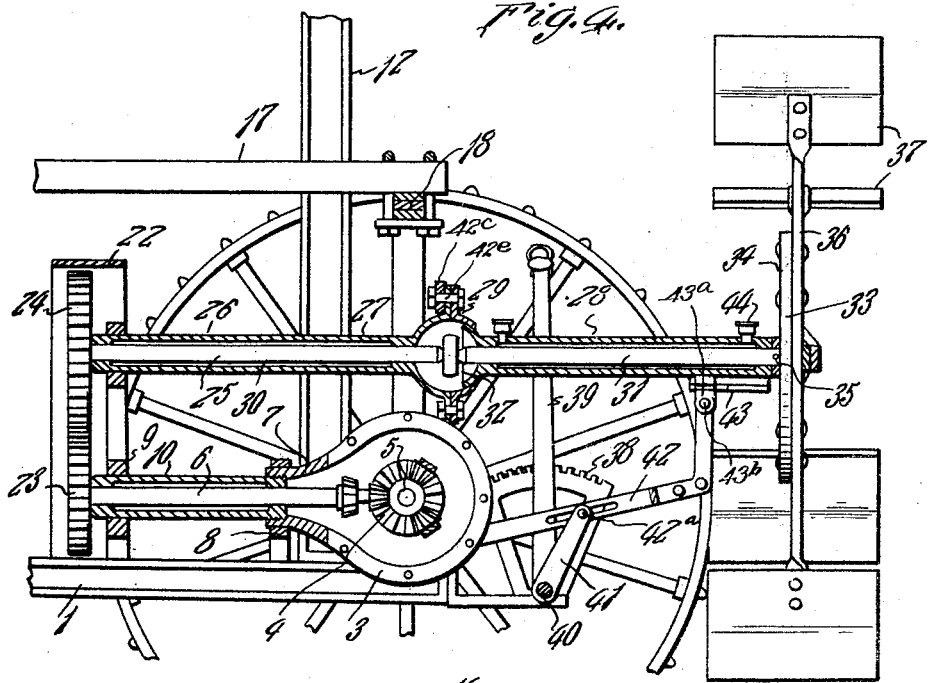
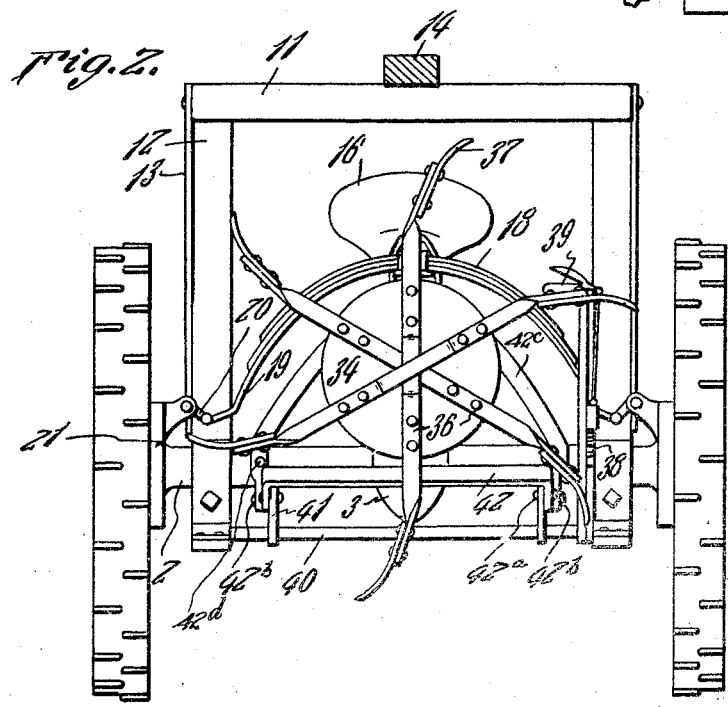
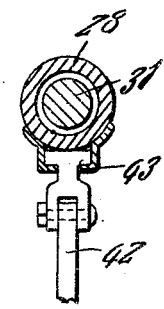
Inventor
Frank Drozd
By [signature]
Attorney Patented Feb. 16, 1926.

1,573,637

UNITED STATES PATENT OFFICE.

FRANK DROZD, OF HALLETTSVILLE, TEXAS, ASSIGNOR OF ONE-HALF TO JULIUS G. JALUFKA, OF HALLETTSVILLE, TEXAS.

COTTON CHOPPER.

Application filed May 16, 1925. Serial No. 30,780.

*To all whom it may concern:*

Be it known that FRANK DROZD, a citizen of the United States of America, residing at Hallettsville, in the county of Lavaca and State of Texas, has invented new and useful Improvements in Cotton Choppers, of which the following is a specification.

The present invention has for its purpose to provide, in a cotton chopper, a rotary chopper operatively carried by a drive shaft, in conjunction with a structure enabling the revoluble chopper to be adjusted vertically. In other words, a portion of the drive shaft and its casing are capable of oscillating movements vertically which permits the revoluble chopper to be correspondingly adjusted.

Another purpose is to provide, in a cotton chopper, means operatively connecting the drive axle of the machine and the revoluble chopper for the purpose of transmitting motion to the latter without interfering with the vertical adjustability of the chopper.

Still another purpose is to provide a frame of simple, efficient and practical construction for supporting the chopper shaft and its connections with the drive axle, the frame being compact, durable and in such design and proportions as to enable the means for adjusting a portion of the chopper shaft to be conveniently located in a position to permit of ready access thereto by the operator.

It is to be understood that the particulars herein given are in no way limitative and that, while still keeping within the scope of the invention, any desired modifications of detail and desired proportions may be made in the apparatus according to the circumstances.

The invention comprises further features and combinations of parts to be hereinafter set forth, shown in the drawings and claimed.

In the drawings:

Figure 1 is a side view of the improved cotton chopper constructed in accordance with the invention.

Figure 2 is a view in front elevation of the same.

Figure 3 is a plan view.

Figure 4 is a longitudinal vertical sectional view through Figure 1.

Figure 5 is an enlarged detail view of the means and its connections with the chopper shaft for adjusting the same.

Referring to the drawings, 1 designates the frame which is supported upon an axle casing 2, said axle casing having a housing 3 for a differential 4 which operatively connects the drive axle 5 and a shaft 6. This shaft 6 is mounted in bearings of an extension housing 7 of the differential housing. A yoke 8 reinforces the housing 7 relative to the frame 1 while a second yoke 9 also rises from the frame 1 and reinforces a casing 10 which is a part of the housing 7.

Rising from the frame 1 and supported thereon is a superimposed frame 11 which is supported by the uprights 12 and reinforced by the braces 13. Mounted upon the frame 11 is a suitable tongue 14 by which the machine may be drawn over the field. The frame 1 has on its rear portion a support 15 for a seat 16. However, in reality, the seat is fastened to a bar 17 from the forward end of which a yoke 18 depends. The arms of this yoke are divergent and terminate in yieldable portions or springs 19 which are operatively supported on knuckle joints 20 carried by housings 21 at the ends of the axle casing 2. In this manner, the seat is capable of yielding due to the machine passing over the irregularities of the field.

A housing 22 rises from the rear lower portion of the frame 1 and contained therein are gears 23 and 24, the former being carried by the shaft 6, the latter being carried by a shaft 25 which is mounted in a shaft housing 26. The shaft housing 26 comprises the two sections 27 and 28 connected together by a universal joint, as at 29. The shaft 25 also comprises two sections 30 and 31 which are also connected by a universal joint 32 at the same location with the joint 29. The section 27 of the shaft housing forms a part of the housing 22, therefore it is firmly supported while the section 28 is capable of being tilted upwardly and downwardly due to the universal joint, and since the two sections of the shaft 25 are universally connected, the section 31 is capable of movement corresponding to the section 28 of the axle housing.

The section 31 of the shaft 25 carries a revoluble chopper 33 which comprises a disk 34 fastened at 35 in any suitable manner to the end of the section 31 of the shaft 25. A plurality of arms 36 are carried by the disk and these, in turn, carry the cutters 37. A segment rack 38 is supported upon the frame 1, there being a lever 39 mounted on a shaft 40 in the lower end of the rack. The shaft is in bearings of the under part of the frame 1 and projecting radially from the shaft are arms 41 which are, in turn, joined by slot and pin connections 42ᵃ to links 42. An arched support 42ᶜ is connected at 42ᵉ to the flanges of the universal joint 29 and the arms of this support are attached at 42ᵈ to the axle casing or housing 2. To depending parts of the arms of the support 42ᶜ, the links 42 are pivotally connected at 42ᵇ. The links are brought together forwardly of the arms 41 and upwardly and are fastened together as shown. The links are also, in turn, adjustably connected in a slotted enlargement of the under part of the section 28 of the shaft housing 26, as at 43. The connection 43 includes a slide 43ᵃ in the slotted enlargement, said slide being pivotally connected at 43ᵇ to the joined upper ends of the links 42, so that when the links 42 are moved upwardly or downwardly, the section 28 of the shaft housing 26 may be moved upwardly and downwardly on its universal joint. This connection is capable of adjustment so as to regulate or render the range of adjustment of the shaft housing section 28 variable. The connection 43 can be set in the slot in order to obtain said result.

The lever 39 has a conventional hand grip controlled dog for cooperating with the teeth of the rack for the purpose of holding the lever in different positions according to the adjustment of the section 28 of the shaft housing 26.

The section 28 of the shaft housing 26 carries two grease cups 44, one immediately adjacent the universal joint of said casing, the other in close proximity to the disk of the chopper, for the purpose of lubricating the shaft 25.

The cutters of the chopper are of such curvature that, as the chopper rotates, they will remove the tops of the cotton plants and, due to the universal adjustment of the shaft casing 26, the cutters can be adjusted according to the heights of the plants.

The invention having been set forth, what is claimed is:

In a cotton chopper, a frame, an axle and axle casing mounted in said frame, the axle including supporting wheels, said axle casing including a differential housing provided with a rearwardly extending shaft housing, a shaft in said shaft housing and having a differential connection with the axle, a second shaft above and in parallelism with the first shaft and overlying the axle at right angles thereto and extending forwardly and provided at its rear with operative connections with the first shaft, a shaft housing for the second shaft, the second shaft and its housing comprising two sections respectively with operative universal joints connecting the respective sections, whereby one section of the second shaft may have oscillating movements upwardly and downwardly, a support carried by the axle casing and connected to the casing of the universal joint of the second shaft housing, the oscillating section of the second shaft extending forwardly and provided with a relatively large revoluble chopper on its forward end, links pivotally connected to extensions of said support and extending forwardly and upwardly and having a sliding connection with the housing of the upwardly and downwardly movable section of the first shaft, manually operated means on the frame and provided with a slot and pin connection with the links for moving the links and thereby imparting upward and downward movements to the movable section of the second shaft, and means for holding the manually operated means in different positions.

In testimony whereof he affixes his signature.

FRANK DROZD.